UNITED STATES PATENT OFFICE.

SAMUEL R. WHITALL, OF SALT LAKE CITY, UTAH TERRITORY.

PROCESS OF LIXIVIATING ORES.

SPECIFICATION forming part of Letters Patent No. 495,715, dated April 18, 1893.

Application filed August 25, 1892. Serial No. 444,116. (No specimens.)

*To all whom it may concern:*

Be it known that I, SAMUEL R. WHITALL, a citizen of the United States, residing at Salt Lake City, in the county of Salt Lake and Territory of Utah, have invented certain new and useful Improvements in the Process of Lixiviating Ores; and I do hereby declare the following to be a full, clear, and exact description of the invention, such as will enable others skilled in the art to which it appertains to make and use the same.

This invention relates to an improvement in the processes of treating auriferous and argentiferous ores, containing besides the precious metal, copper, iron and other impurities, the ores existing as natural chlorides, sulphides, or arsenides and compounds of base metals generally.

The invention consists in subjecting the ores to the action of a solution containing a cyanide, preferably potassium cyanide, in combination with a hyposulphite solution, preferably sodium hyposulphite, in such quantities as may be necessary for the thorough recovery of the precious metals.

The invention further consists in subjecting the ores to such treatment as above noted, with the additional step of precipitating the metals from their solution by means of zinc or by electrolysis of the solution; and in such details of operation as will be hereinafter fully described, and set forth, and particularly pointed out in the claims.

The nature of the ore may require for its treatment certain preliminary operations. In all cases the ore is first crushed to pass through a sixteen to forty mesh screen and if of a highly silicious nature is roasted to oxidize the baser metals. I then mix with the ore a proper preparation of caustic soda or potash and treat the whole in a closed tank with steam, heated to such a temperature and under sufficient pressure to form a soluble silicate (water glass), thereby freeing the precious metals from their combinations with base metals and rendering the ore peculiarly adapted for the subsequent operation. If the ore is a sulphide it is given a chlorinating roast with salt, in any suitable form of roasting furnaces and after roasting is lixiviated with water. The wash water is drawn off into the precipitating tanks and any copper or lead contained therein as chlorides is precipitated by well known means. After having treated the ore as above indicated, according to the special requirements of the case, or if the ore is a natural chloride, I proceed to subject it to the following treatment, which constitutes the essential features of my invention. The ore is placed dry in a tank made of or lined with any inert material as slate, cement, brick, or any other material not appreciably acted on by the solution. A solution composed of from one-half to one and one-half per cent. of potassium cyanide with about one third this quantity of sodium hyposulphite, to quantity of ore used, or in greater proportions if necessary, is poured over the ore and allowed to percolate through the same. Water in quantity sufficient to cover the ore to a depth of one foot or more is then added and the whole allowed to remain for a length of time to insure the solution of the precious metals. When this is determined the cyanide and hyposulphite solution containing the gold and silver, is drawn off to the precipitating tanks and made to pass over zinc shavings, where the precious metals are precipitated from the solution and retained in the shavings. The gold and silver precipitated from the solution may be removed from the zinc by well known methods. This course may be adapted and followed but my preferred method of precipitating the metals in the combined cyanide and hyposulphite solutions is by electrolysis. For this purpose I employ a platinum or carbon anode and a cathode of wires or strips of suitable metal, preferably iron arranged in parallel lines on copper wires projecting into the solution. The gold and silver combined will be deposited on the wires in the form of a finely divided powder, which is collected, dried and melted into bars.

I have stated in the above description that potassium cyanide is used, but any cyanide soluble in water as barium, calcium or sodium cyanide may be employed.

Having thus described my invention, what I claim is—

1. The process of separating gold and silver from their ores which consists in subjecting the ore to the action of a solution of potassium cyanide and sodium hyposulphite and subsequently precipitating the dissolved metal, substantially as described.

2. The process of separating gold and silver from their ores which consists first in roasting the ore to oxidize the base metals and secondly, in subjecting the roasted ore to the action of a solution of potassium cyanide and sodium hyposulphite, and subsequently precipitating the dissolved metals, substantially as described.

3. The process of separating gold and silver from their ores which consists in subjecting the ore to the action of a solution of potassium cyanide and sodium hyposulphite and precipitating the dissolved metals by electrolysis of the solution, substantially as described.

4. The process of separating gold and silver from silicious ores, which consists in subjecting the ore admixed with caustic soda and potash, to the action of a solution of potassium cyanide and sodium hyposulphite, substantially as described.

In testimony whereof I affix my signature in presence of two witnesses.

SAMUEL R. WHITALL.

Witnesses:
WILLIAM V. R. WHITALL,
ROBERT WENDT.